US008855128B2

(12) United States Patent
Kashyap

(10) Patent No.: US 8,855,128 B2
(45) Date of Patent: *Oct. 7, 2014

(54) ENHANCEMENT OF END-TO-END NETWORK QOS

(75) Inventor: Vivek Kashyap, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 234 days.

This patent is subject to a terminal disclaimer.

(21) Appl. No.: 13/026,687

(22) Filed: Feb. 14, 2011

(65) Prior Publication Data
US 2011/0134753 A1 Jun. 9, 2011

Related U.S. Application Data

(63) Continuation of application No. 11/777,888, filed on Jul. 13, 2007, now Pat. No. 7,936,772.

(51) Int. Cl.
H04L 12/28 (2006.01)
H04L 12/861 (2013.01)
H04L 12/851 (2013.01)
H04L 12/879 (2013.01)

(52) U.S. Cl.
CPC ............ *H04L 47/2441* (2013.01); *H04L 49/90* (2013.01); *H04L 49/9063* (2013.01); *H04L 47/2408* (2013.01); *H04L 49/9031* (2013.01); *H04L 49/901* (2013.01)
USPC .......................................................... 370/414

(58) Field of Classification Search
USPC .................... 370/412–414, 428–9, 395.51
See application file for complete search history.

(56) References Cited

U.S. PATENT DOCUMENTS 6,640,248 B1  10/2003  Jorgensen
6,667,983 B1  12/2003  Lo et al.
6,940,813 B2   9/2005  Ruutu
(Continued)

FOREIGN PATENT DOCUMENTS

JP    9247192 A    9/1997
JP   10289181 A   10/1998
(Continued)

OTHER PUBLICATIONS

P. Woojin et al., "Marking mechanism for enhanced end-to-end QoS quarantees in multiple DiffServ environment," Korea Univ. Dept. of Electron. & Comput. Eng., 2005, Abstract, 1 page.
H. Sanneck et al., "A queue management algorithm for intra-flow service differentiation in the "best effort" internet," Proceedings Eight International Conference on Computer Communications and Networks, 1999, pp. 419-426.
(Continued)

*Primary Examiner* — Peter Cheng
(74) *Attorney, Agent, or Firm* — Walter W. Duft

(57) ABSTRACT

A network endpoint system and related method and computer program product for use in a network to support enhanced end-to-end QoS in the network. The network endpoint system is adapted to receive network data of varying priority on behalf of a data consumer operating at the application layer of a network protocol stack implemented by the network endpoint system. The network endpoint system includes a network interface controller adapted to receive network frames containing the network data, plural network data handling channels each having an associated priority, and priority processing logic adapted to transfer the network data from the network interface controller to the plural data handling channels on a prioritized basis according to the network data priority. Also disclosed are a network interface controller and a network node to support enhanced end-to-end QoS in a network.

24 Claims, 13 Drawing Sheets

(56) References Cited

U.S. PATENT DOCUMENTS

| | | | |
|---|---|---|---|
| 7,471,689 B1 * | 12/2008 | Tripathi et al. | 370/395.42 |
| 7,746,783 B1 * | 6/2010 | Tripathi et al. | 370/235 |
| 7,936,772 B2 * | 5/2011 | Kashyap | 370/414 |
| 8,254,339 B2 | 8/2012 | Bazar | |
| 2002/0107955 A1 | 8/2002 | Rawson, III | |
| 2002/0194369 A1 | 12/2002 | Rawlins et al. | |
| 2004/0024873 A1 | 2/2004 | DiMambro | |
| 2005/0097226 A1 * | 5/2005 | Tripathi | 709/250 |
| 2005/0135396 A1 | 6/2005 | McDaniel et al. | |
| 2006/0015651 A1 | 1/2006 | Freimuth et al. | |
| 2007/0201499 A1 | 8/2007 | Kapoor et al. | |

FOREIGN PATENT DOCUMENTS

| | | | |
|---|---|---|---|
| JP | 2000092106 A | 3/2000 | |
| JP | 2004088219 A | 3/2004 | |
| JP | 2004128810 A | 4/2004 | |
| JP | 2005217491 A | 8/2005 | |

OTHER PUBLICATIONS

H. Sanneck et al., "Predictive loss pattern queue management for Internet routers," Proceedings of the SPIE—The International Society for Optical Engineering, 1998, vol. 3529, pp. 205-216, Abstract, 2 pages.

K. H. Yum et al., "Qos Provisioning in Clusters: An Investigation of Router and NIC Design," Penn. State Univ., Dept. of Comp. Sci. and Eng., 2001, pp. 120-129.

R. J. Recio, "Server I/O Networks Past, Present, and Future," Proceedings of the ACM SIGCOMM 2003 Workshops, 2003, pp. 163-178.

G. Chuanxiong et al., "Analysis and Evaluation of the TCP/IP Protocol Stack of Linux," Institute of Communications Engineering, 1999, 10 pages.

3Com Corporation, 3Com Etherlink 10/100 PCI NICs with 3XP Processor, 1999, 4 pages.

Ryota Ozaki et al., "Priority-based Receiver Processing in the Linux Kernel" IPSJ Journal vol. 45, No. 3, Mar. 2004, p. 785-793.

* cited by examiner

ENHANCEMENT OF END-TO-END NETWORK QOS

This application is a continuation under 35 U.S.C. 120 of application Ser. No. 11/777,888, filed Jul. 13, 2007, entitled "Enhancement of End-To-End Network QOS."

BACKGROUND OF THE INVENTION

1. Field of the Invention

The present invention relates to digital networks and the handling of information traffic therein. More particularly, the invention concerns the provision of differentiated quality of service (QoS) levels for data exchanged between endpoints in an Internet Protocol (IP) network.

2. Description of the Prior Art

By way of background, various QoS mechanisms have been implemented to provide prioritized data transmission service in modern IP networks. Instead of using a "best effort" communication mode that treats all data the same, these QoS mechanisms prioritize network traffic into differentiated service categories. High priority traffic categories may thus be defined (e.g., voice communications, video/audio streams, etc.) and processed at a higher priority than other network data, thereby reducing undesirable network transmission problems such as dropped packets, latency, jitter, etc. Well known QoS mechanisms include the link level traffic prioritization scheme defined by the IEEE (Institute of Electrical and Electronics Engineers) 802.1p standard and the network level prioritization schemes implemented by RSVP (ReSource reserVation Procotol) and DiffServ (Differentiated Service).

Although the foregoing QoS mechanisms work well for transporting data across routing nodes within an IP network, bottlenecks can develop at network endpoints when the endpoint systems are unable to process the packets they receive in a timely fashion. This can occur, for example, when device/system queues are full, memory is low, processing resources are overburdened, etc. As a result, high priority packets can be dropped or blocked behind normal or low priority packets, thus defeating the purpose of the QoS scheme.

Accordingly, a need exists for an improvement in the provision of network QoS such that bottlenecks associated with network endpoints can be reduced or eliminated. What is required is a technique that allows incoming high priority packets to be handled efficiently and with due regard being given to their QoS priority level.

SUMMARY OF THE INVENTION

The foregoing problems are solved and an advance in the art is obtained by a network endpoint system and related method and computer program product for use in a network to support enhanced end-to-end QoS in the network. The network endpoint system is adapted to receive network data of varying priority on behalf of a data consumer operating at the application layer of a network protocol stack implemented by the network endpoint system. The network endpoint system includes a network interface controller adapted to receive network frames containing the network data, plural network data handling channels each having an associated priority, and priority processing logic adapted to transfer the network data from the network interface controller to the plural data handling channels on a prioritized basis according to the network data priority.

According to exemplary disclosed embodiments, the network data priority may be indicated by a priority indicator field in the network frames. The network interface controller or a network interface controller device driver in the system may implement the priority processing logic to inspect the priority indicator field as one of a link layer priority indicator in a link layer portion of the frame or a network layer priority indicator in a network packet portion of the frame. The plural network data handling channels may include plural ring buffers containing buffer descriptors corresponding to the network data. The priority processing logic may then be implemented by priority mapping logic in the network interface controller adapted to inspect the network frames and deliver the buffer descriptors to the plural ring buffers on a prioritized basis according to the network data priority. The priority processing logic may be further implemented by ring buffer selection logic in a network interface controller device driver in the system adapted to process the buffer descriptors in the plural ring buffers on a prioritized basis according to the network data priority. The plural network data handling channels may alternatively comprise plural kernel protocol stack channels adapted to process buffer descriptors corresponding to the network data. In that case, the priority processing logic may be implemented by channel selection logic in a network interface controller device driver in the system adapted to deliver the buffer descriptors to the kernel protocol stack channels on a prioritized basis according to the network data priority. The plural kernel protocol stack channels may comprise plural buffer descriptor queues adapted to enqueue the buffer descriptors on a prioritized basis according to the network data priority. Alternatively, the plural kernel protocol stack channels may comprise prioritized buffer descriptor processing threads. The system may further include buffer allocation logic adapted to allocate the buffer descriptors on a prioritized basis according to the network data priority and in accordance with memory availability. If the data consumer of the system also acts as a network data source, the priority processing logic may be further adapted to transfer the network data from the plural data handling channels to the network interface controller on a prioritized basis according to the network data priority.

In further aspects, a network interface controller and a network node are provided to support enhanced end-to-end QoS in a network. The network interface controller includes a frame receiver adapted to receive network frames containing the network data from a network link, a host input/output unit adapted to provide the network data to the host network endpoint system, and priority mapping logic in the network interface controller adapted to transfer the network data to plural data handling channels of the host network endpoint system according to the network data priority. The network node includes a first link interface adapted to receive network frames containing the network data from an edge of the network, a second link interface adapted to send the network frames to the network endpoint system, and priority insertion logic adapted to inspect a network layer portion of the network frames for a priority indicator corresponding to the network data priority and to insert a corresponding priority indicator in a link layer portion of the network frames.

BRIEF DESCRIPTION OF THE DRAWINGS

The foregoing and other features and advantages of the invention will be apparent in the from the following more particular description of exemplary embodiments of the invention, as illustrated accompanying Drawings, in which.

DETAILED DESCRIPTION OF EXEMPLARY EMBODIMENTS

Figure 1:
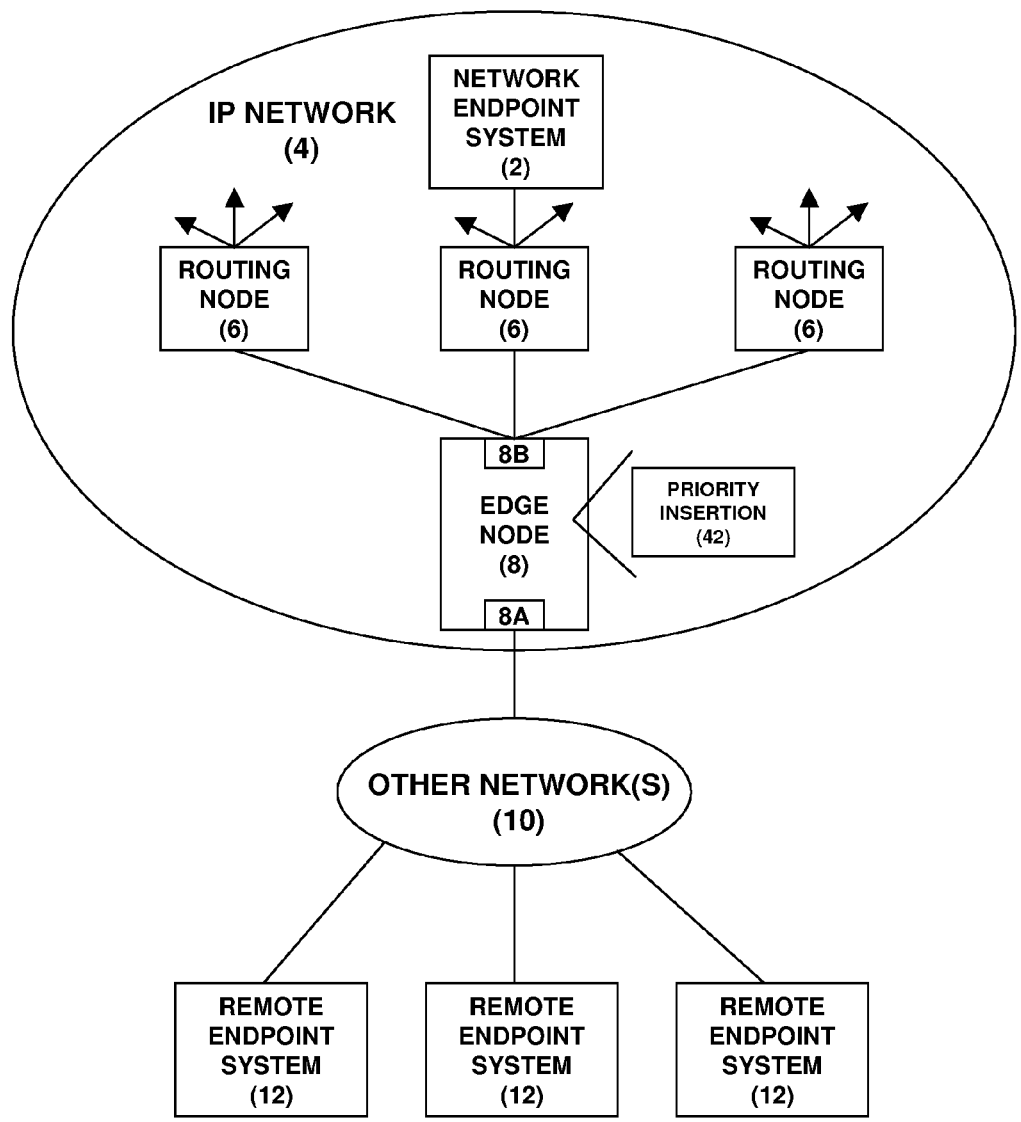
FIG. 1 is a functional block diagram showing an exemplary IP network.

Turning now to drawing figures, wherein like reference numerals indicate like elements in all of the several views, FIG. 1 illustrates a network endpoint system 2 disposed within an IP network 4. The IP network 4 is shown by way of example only to include one or more internal routing nodes 6, together with an edge node 8. The routing nodes can be implemented as routers, switches, hubs or any other network device capable of forwarding packets bound for network endpoints. The edge node 8 is similar in most respects to the internal routing nodes 6, but is adapted to act as an interface between the network 4 and one or more other networks, shown by reference numeral 10. The networks 10 provide pathways from the network 4 to one or more remote endpoint systems 12 that are assumed to be capable of sending data packets of varying priority to the endpoint system 2. The edge node 8 includes a first link interface 8A adapted to receive network frames containing network data from an edge of the network 4, and a second link interface 8B adapted to send the network frames to the network endpoint system 2.

The network 4 can be implemented using any of a variety of connectionless (or connection-oriented) networking technologies that support the IP network layer protocol. At the physical level, the interconnections between the various elements that comprise the network 4 may be provided by electrical wiring, fiber optic cabling, wireless links or any combination thereof. At the data link level, the network 4 may implement Media Access Control (MAC) framing or any other suitable data link level protocol. IP networks of this type include those built according to the IEEE 802.x family of standards, such as Ethernet (802.3) and Wireless Protocol (802.11). The network 4 is further assumed to implement a QoS mechanism such as one of those described by way of background above.

Unlike conventional IP network endpoints, the endpoint 2 is adapted to handle packets having different priorities in a manner that preserves the QoS scheme implemented in the network 4. Before describing how this is achieved, it will be helpful to review network packet processing as performed by a conventional IP network host. Such a host is shown by reference numeral 20 in FIG. 2. The host 20 includes a network interface card (NIC) 22 that is connected to a network link 24. The network link 24, which may be wire-based or wireless, carries link-layer frames (e.g., Ethernet frames) that encapsulate IP packets. The NIC 22 is managed by an operating system NIC device driver 26 that is responsible for transferring frame data between the NIC and an operating system kernel protocol stack 28. The kernel protocol stack 28 is responsible for transferring the data to and from one or more applications, such as applications $30_1$, $30_2$ and $30_3$, each of which may act as a data source or a data sink. As shown, the applications $30_1$, $30_2$ and $30_3$ may have different priorities relative to the network traffic they handle. For example, application $30_1$ could be a high priority delay sensitive application engaged in interactive video conferencing or voice communication, application $30_2$ could be a medium priority controlled load application engaged in streaming multimedia or business-critical traffic handling, and application $30_3$ could be a low priority best efforts application engaged in file transfer, web browsing, etc.

Within the memory of the host 20 are a pair of ring buffers that assist in transferring frame data between the NIC 24 and the kernel protocol stack 28. One ring buffer 32 is used for frame transmission (TX) and the other ring buffer 34 is used for frame reception (RX). Each ring buffer represents a circular FIFO (first in, first out) queue of buffer descriptors containing pointers to frame-containing buffers in the host memory. Transmit buffers containing data that are associated with frame transmission are referenced on the transmit ring buffer 32. Receive buffers containing data that are associated with frame reception are referenced on the receive ring buffer 34. Each ring buffer 32 and 34 has a pair of pointers for reading and writing the enqueued buffer descriptors. The transmit ring buffer 32 has a host write pointer ("HOST WRITE") that identifies the current queue slot for writing transmit buffer descriptors and a NIC read pointer ("NIC READ") that identifies the current queue slot for reading transmit buffer descriptors. The receive ring buffer 34 has a NIC write pointer ("NIC WRITE") that identifies the current queue slot for writing receive buffer descriptors and a host read pointer ("HOST READ") that identifies the current queue slot for reading receive buffer descriptors.

Figure 3:
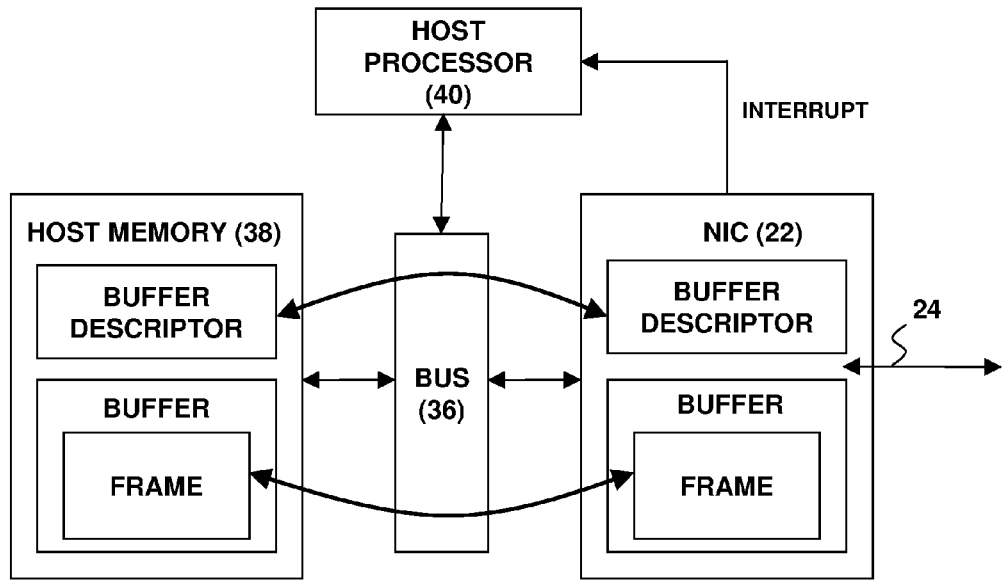
FIG. 3 is a functional block diagram showing a further view of the network data processing performed by the prior art IP network host of FIG. 2.
Figure 4:
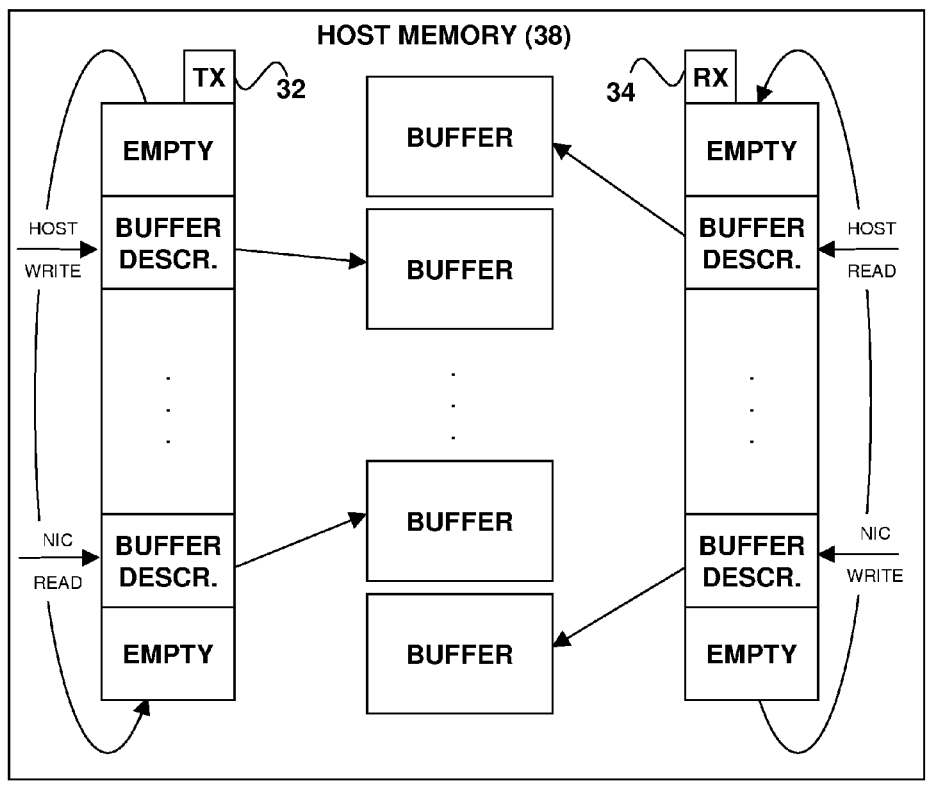
FIG. 4 is a functional block diagram showing a still further view of the network data processing performed by the prior art IP network host of FIG. 2.

During packet reception, the network interface card (NIC) 22 receives a link layer frame that contains an IP packet from the network link 24. It is assumed for purposes of discussion only that the NIC 22 is a modern interface card that is capable of performing bus mastering DMA (direct memory access) data transfers with the network host on which it resides. Other types of NIC could also be used. For NICs that do not have bus mastering capability, the NIC device driver will need to support the data transfer. The NIC 22 may include a transceiver $22_1$ for accessing the network link medium, a host input/output (I/O) unit $22_2$, a packet receive memory $22_3$, a packet transmit memory $22_4$, and a frame processor $22_5$. With additional reference now to FIG. 3, the incoming frame is placed in a local receive buffer (located in the NIC's receive memory $22_3$), and the NIC processor $22_5$ initiates a DMA transfer to the host 20 (via the NIC I/O unit $22_2$). The frame contents are transferred over a host bus 36 and written into a buffer within the host memory 38. The NIC processor $22_5$ determines the memory address for the start of the frame by examining a next free buffer descriptor that the NIC processor $22_5$ will have previously fetched from the host 20. The NIC 22 modifies the previously fetched buffer descriptor to add information about the new frame, such as its length, checksum information, etc., then initiates a DMA transfer of the modified buffer descriptor to the host memory 38. In particular, as additionally shown in FIG. 4, the modified buffer descriptor is placed in the host receive ring buffer 34 using the current value of that ring buffer's NIC write pointer. Depending on how the NIC 22 is configured to interact with the host operating system, the NIC may then raise a hardware interrupt that will invoke the NIC device driver 26 to read the modified buffer descriptor on the receive ring buffer 34 in order to retrieve the new frame and process it into the host's kernel protocol stack. For efficiency reasons, such an interrupt is normally raised after some number of incoming frames have been processed by the NIC 22 and their buffer descriptors have been DMA burst-transferred onto the receive ring buffer 34. In servicing the interrupt, the NIC device driver 26 uses the receive ring buffer's host read pointer to locate all modified buffer descriptors placed in the receive ring buffer 34 by the NIC 22 since the last interrupt. The device driver 26 then passes the modified buffer descriptors to the kernel protocol stack 28 for further processing and returns from the interrupt. Note that polling could be used in lieu of a hardware interrupt in order to invoke the NIC device driver 26 to service the receive ring buffer 34.

The foregoing process is essentially reversed during packet transmission. The host operating system is informed that new frame data to be transmitted is in a buffer of the host memory 38. The operating system builds a buffer descriptor for the frame and places it in the transmit ring buffer 32, using the host write pointer to do so. The NIC device driver 26 notifies the NIC 22 that the new buffer descriptor is ready to be fetched and processed. For efficiency reasons, the NIC 22 is normally notified after some number of frames are ready to be processed for transmission. The NIC processor $22_5$ initiates a DMA burst transfer of the new buffer descriptors from the transmit ring buffer 32 and processes them. After determining the memory addresses of the buffers holding the new frames, the NIC processor $22_5$ initiates a DMA transfer of the frame contents across the host bus 36. The frame contents are received via the NIC I/O unit $22_2$ and placed in a local transmit buffer in the NIC's transmit memory $22_4$. When all segments of a given frame have arrived, the NIC 22 transmits that frame onto the network link 24. Depending on how the NIC 22 is configured to interact with the host operating system, the NIC may raise an interrupt to the host 20 to indicate that the frame transmission has completed.

As described by way of background above, a deficiency of the foregoing frame processing procedure is that QoS priorities cannot be handled satisfactorily. During frame reception, incoming frames are enqueued (by reference) on the receive ring buffer 32 in the order in which they are received from the NIC 22. This means that high priority frames whose data is destined for the high priority application $30_1$ may be interspersed with lower priority frames destined for the medium priority application $30_2$ or the low priority application $30_3$. Given the often bursty nature of network traffic, a high priority frame might be enqueued on the receive ring buffer 32, followed by a burst of several low priority frames, and followed again by another high priority frame. Because, the NIC device driver 26 processes the buffer descriptors on the receive ring buffer 32 in sequence (by incrementing the host read pointer), the high priority application $30_1$ can suffer undesirable communication latency while the device driver processes the low priority frames. During frame transmission, outgoing frames are enqueued on the transmit ring buffer 34 in the order in which they are received from the kernel protocol stack 28. This means that high priority frames emanating from the high priority application $30_1$ may be interspersed with lower priority frames from the medium priority application $30_2$ or the low priority application $30_3$. Again, given the often bursty nature of network traffic, a high priority frame might be enqueued on the transmit ring buffer 34, followed by a burst of several low priority frames, and followed again by another high priority frame. Because, the NIC processor $22_5$ processes the buffer descriptors on the transmit ring buffer 34 in sequence (by incrementing the NIC read pointer), the high priority application $30_1$ can suffer undesirable communication latency while the NIC processes the low priority frames.

Figure 2:
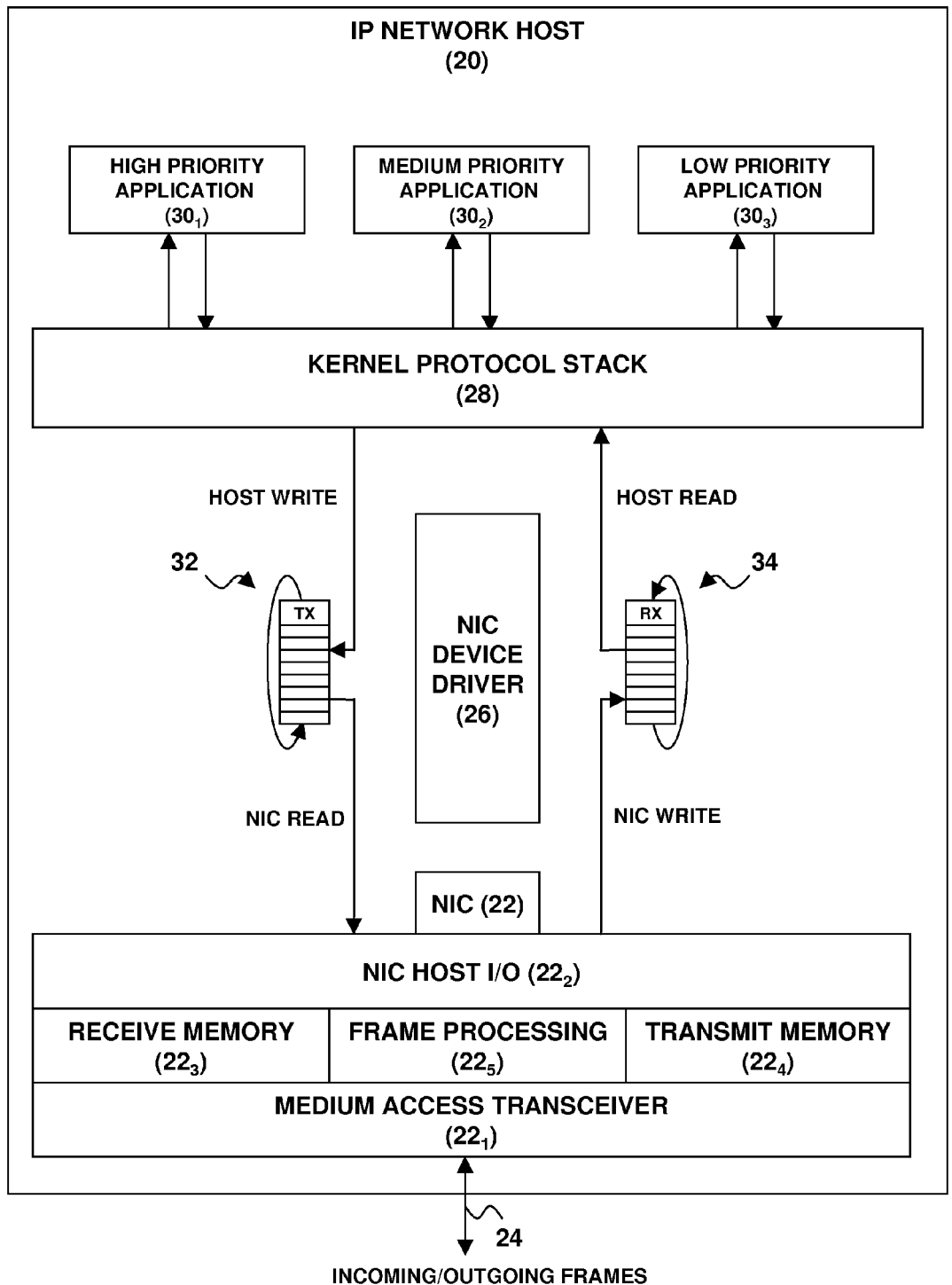
FIG. 2 is a functional block diagram showing exemplary network data processing in a prior art IP network host.
Figure 5:
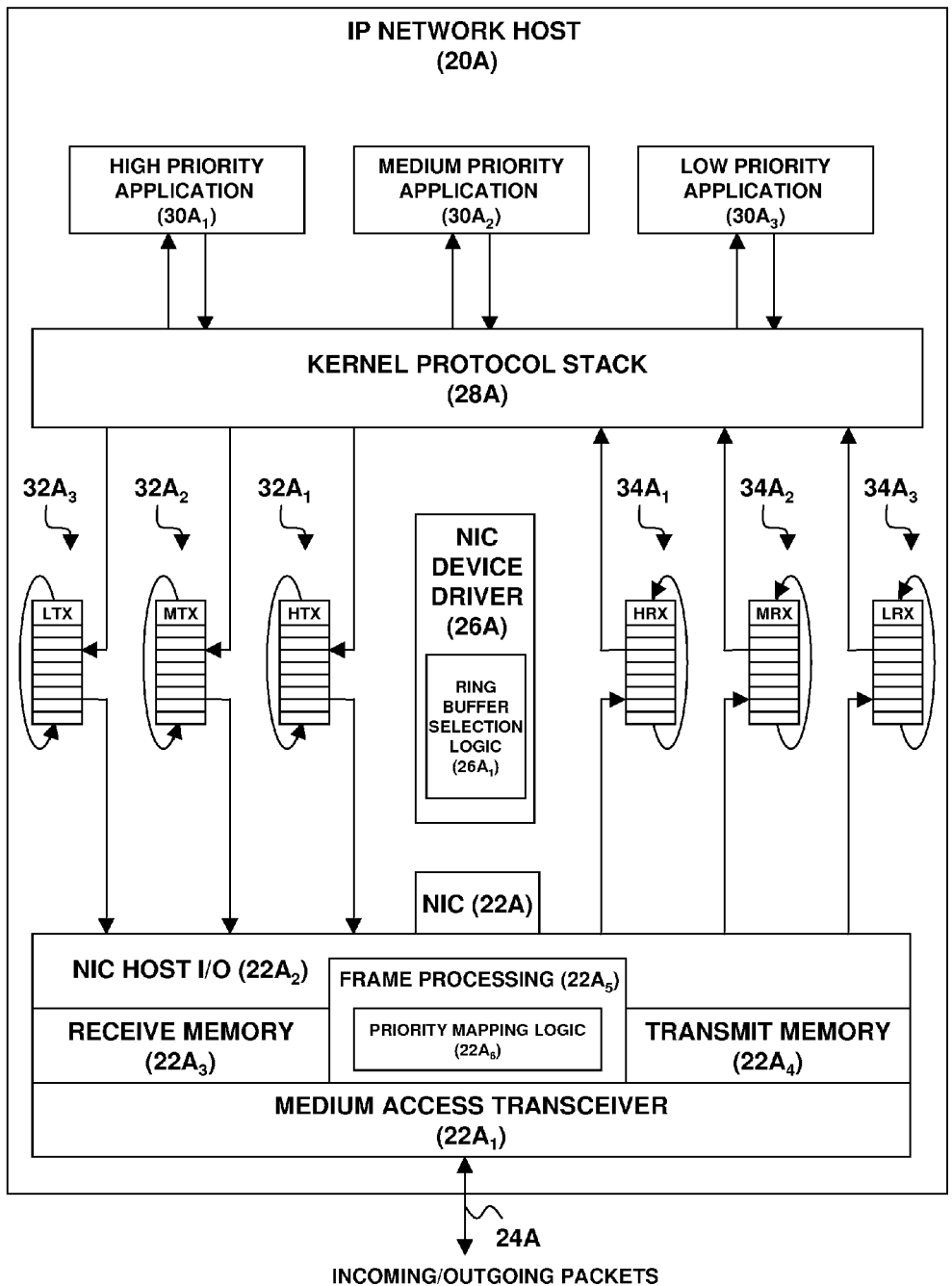
FIG. 5 is a functional block diagram showing exemplary network data processing performed by a first exemplary improved IP network host.

The present disclosure illustrates several ways that the network endpoint system 2 of FIG. 1 can be improved in order to overcome the foregoing problem and provide support enhanced end-to-end network QoS. Each technique involves the use of multiple network data handling channels to separately handle frames with different QoS priorities, such that higher priority frames will not be blocked behind lower priority frames. In one implementation, shown in FIG. 5, the network endpoint system 2 is embodied as an improved IP network host 20A that is identical in most respects to the network host 20 of FIG. 2 (as shown by the use of substantially corresponding reference numerals). However, instead of just a single pair of send/receive buffers 32/34 as shown in FIG. 2, the network host 20A and the NIC 22A support multiple pairs of send/receive ring buffers $32A_1/34A_1$, $32A_2/34A_2$ and $32A_3/34A_3$. Each ring buffer pair represents a driver-level frame processing channel that can be associated with a given QoS priority. In FIG. 5, the ring buffer pair $32A_1/34A_1$ (with each ring buffer respectively labeled HTX and HRX) corresponds to a high priority level, the ring buffer pair $32A_2/34A_2$ (with each ring buffer respectively labeled MTX and MRX) corresponds to a medium priority level, and the ring buffer pair $32A_3/34A_3$ (with each ring buffer respectively labeled LTX and LRX) corresponds to a low priority level. It will be appreciated that additional ring buffer pairs may be added if more priority levels are needed, the depiction of three ring buffer pairs herein being arbitrary and for purposes of illustration only. The NIC processor $22A_5$ of FIG. 5 is different from the conventional NIC processor $22_5$ of FIG. 2 in that it includes priority mapping logic $22A_6$ that associates the send/receive buffers $32A_1/34A_1$, $32A_2/34A_2$ and $32A_3/34A_3$ with different QoS priorities.

Figure 5A:
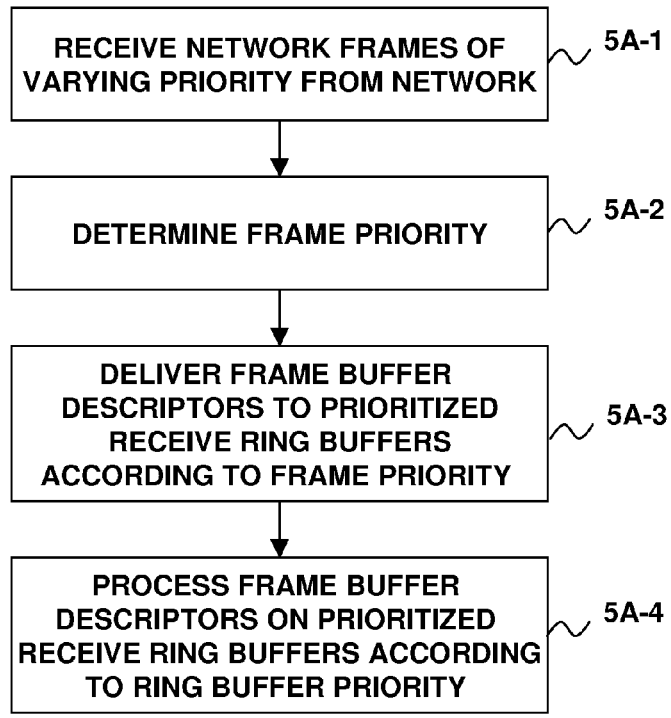
FIG. 5A is a flow diagram showing exemplary frame reception processing performed by the IP network host of FIG. 5.

With additional reference now to the flow diagram of FIG. 5A, when receiving frames (step 5A-1), the NIC priority mapping logic $22A_6$ reads QoS information in each incoming frame (step 5A-2) and places the frame (by reference) in the correct receive ring buffer $34A_1$, $34A_2$ or $34A_3$ for processing (step 5A-3). The NIC device driver 26A is also modified to include ring buffer selection logic $26A_1$. When the NIC device driver 26A is invoked following frame reception, the ring buffer selection logic $26A_1$ processes the receive ring buffers $34A_1$, $34A_2$ and $34A_3$ in the order of their respective priorities (step 5A-4). In particular, each time the NIC device driver 26A is invoked in response to a NIC hardware interrupt or a NIC polling operation, it processes the high priority receive ring buffer $34A_1$ first, passing all high priority buffer descriptors thereon to the kernel protocol stack 28A for delivery to the high priority application $30A_1$. Similar processing is then performed on the medium priority receive ring buffer $34A_2$, followed by the low priority receive ring buffer $34A_3$. This removes the device bottleneck resulting from the interleaved processing of different priority frames and enables such frames to be processed by the kernel protocol stack according to their relative QoS priorities.

Figure 5B:
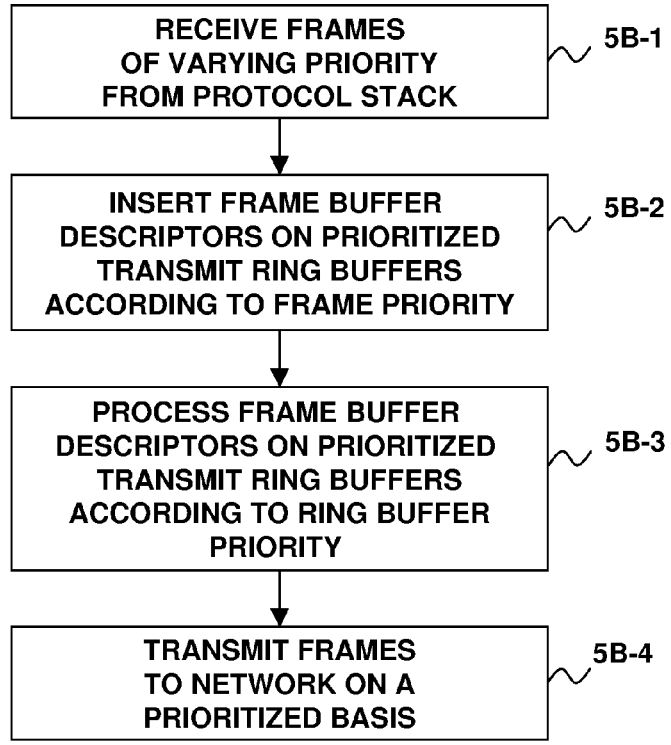
FIG. 5B is a flow diagram showing exemplary frame transmission processing performed by the IP network host of FIG. 5.

With additional reference now to the flow diagram of FIG. 5B, when sending packets, the NIC device driver's ring buffer selection logic $26A_1$ evaluates the priority of the buffer descriptors received from the kernel protocol stack 28A (step 5B-1) and places them on the corresponding transmit ring buffers $32A_1$, $32A_2$ or $32A_3$ (step 5B-2). In step 5B-3, after the NIC 22A is notified that the new frames are ready for transmission, the NIC's priority mapping logic $22A_6$ processes the high priority transmit ring buffer $32A_1$ first so that high priority frames are transmitted ahead of medium priority and low priority frames. Similar processing is then performed on the medium priority transmit ring buffer $32A_2$, followed by the low priority transmit ring buffer $32A_3$. This removes the device bottleneck resulting from the interleaved processing of different priority frames and enables such frames to be transmitted onto the network link 24A according to their relative QoS priorities, thus resulting in QoS enhanced transmission (step 5B-4).

Figure 6:
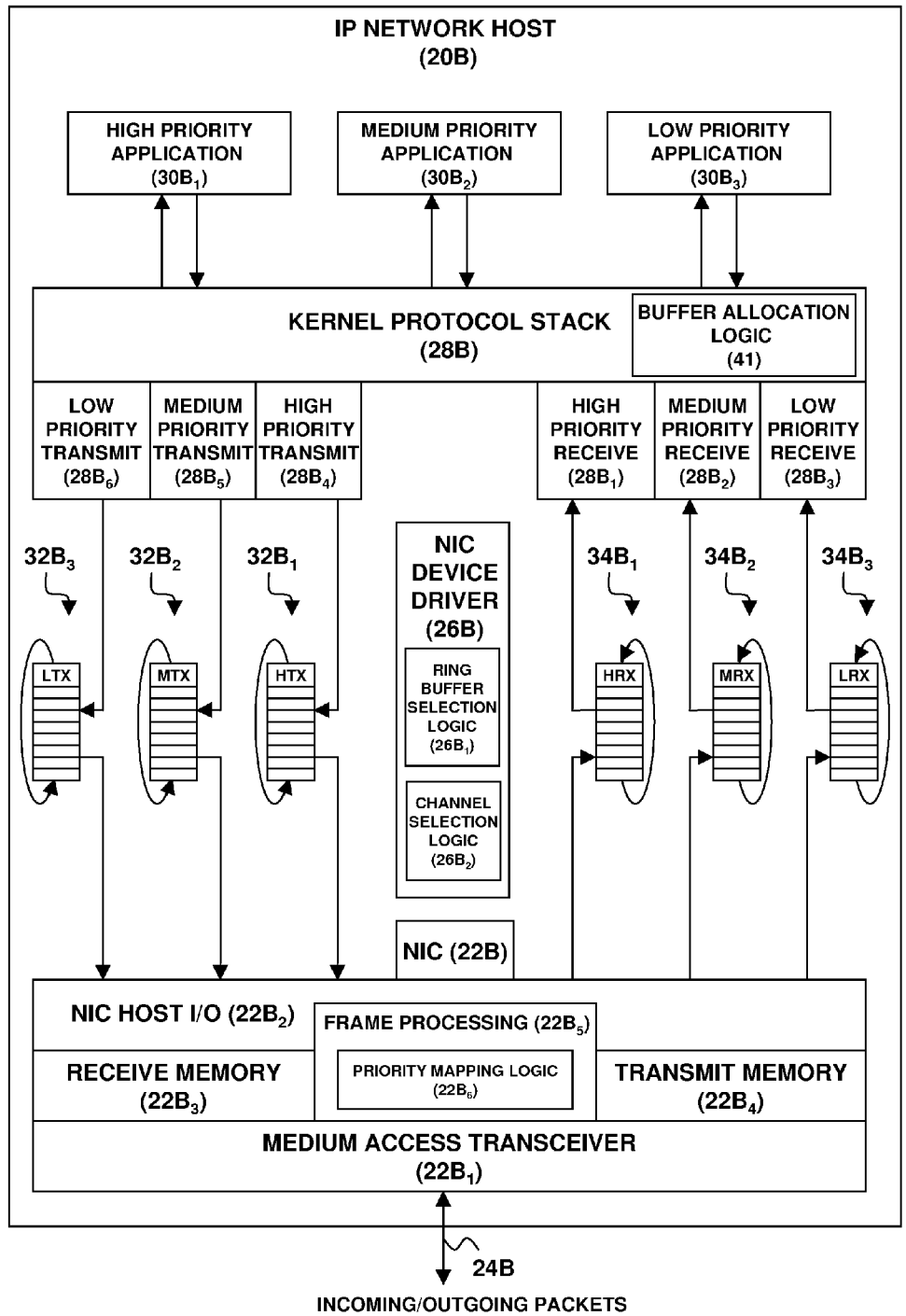
FIG. 6 is a functional block diagram showing exemplary network data processing performed by a second exemplary improved IP network host.

FIG. 6 illustrates an alternative implementation in which the network endpoint system 2 is embodied in an improved IP network host 20B that is identical in most respects to the network host 20A of FIG. 5 (as shown by the use of substantially corresponding reference numerals). However, in the FIG. 6 implementation each of the receive/transmit ring buffers $32B_1/34B_1$, $32B_2/34B_2$ and $32B_3/34B_3$ is associated with a protocol stack-level frame priority channel within the kernel protocol stack 28B. The NIC device driver 26B further includes channel selection logic $26B_2$ for implementing the foregoing associations. The receive ring buffers $34B_1$, $34B_2$ and $34B_3$ are respectively associated with kernel protocol receive channels $28B_1$, $28B_2$ and $28B_3$. The transmit ring buffers $32B_1$, $32B_2$ and $32B_3$ are respectively associated with kernel protocol transmit channels $28B_4$, $28B_5$ and $28B_6$.

Figure 6A:
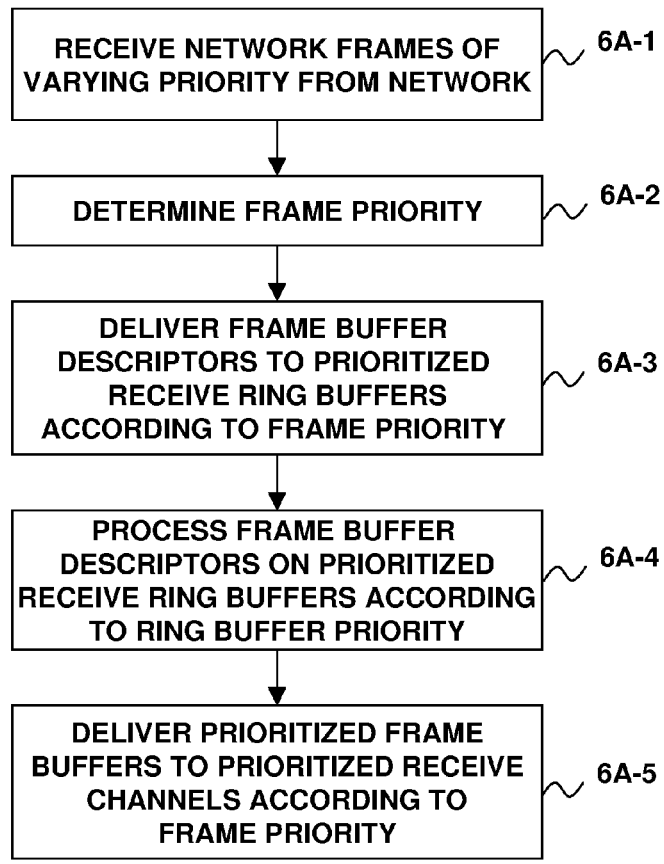
FIG. 6A is a flow diagram showing exemplary frame reception processing performed by the IP network host of FIG. 6.

With additional reference now to the flow diagram of FIG. 6A, during frame reception (step 6A-1), the NIC priority mapping logic $22B_6$ reads QoS information in each incoming frame (step 6A-2) and places the frame (by reference) in the correct receive ring buffer $34B_1$, $34B_2$ or $34B_3$ for processing (step 6A-3). Each time the NIC device driver 26B is invoked in response to a NIC hardware interrupt or a NIC polling operation, the ring buffer selection logic $26B_1$ processes the receive ring buffers $34B_1$, $34B_2$ and $34B_3$ in the order of their respective priorities (step 6A-4). The NIC device driver 26B then transfers the buffer descriptors from the prioritized receive ring buffers $34A_1$, $34A_2$ and $34A_3$ to the prioritized receive channels $28B_1$, $28B_2$ and $28B_3$ according to their respective priorities (step 6A-5). In particular, the NIC device driver's channel selection logic $26B_2$ transfers buffer descriptors from the high priority receive ring buffer $34B_1$ to the high priority receive channel $28B_1$. Similarly, medium priority buffer descriptors are transferred from the medium priority receive ring buffer $34B_2$ to the medium priority receive channel $28B_2$, and low priority buffer descriptors are transferred from the low priority receive ring buffer $34B_3$ to the low priority receive channel $28B_3$.

Figure 6B:
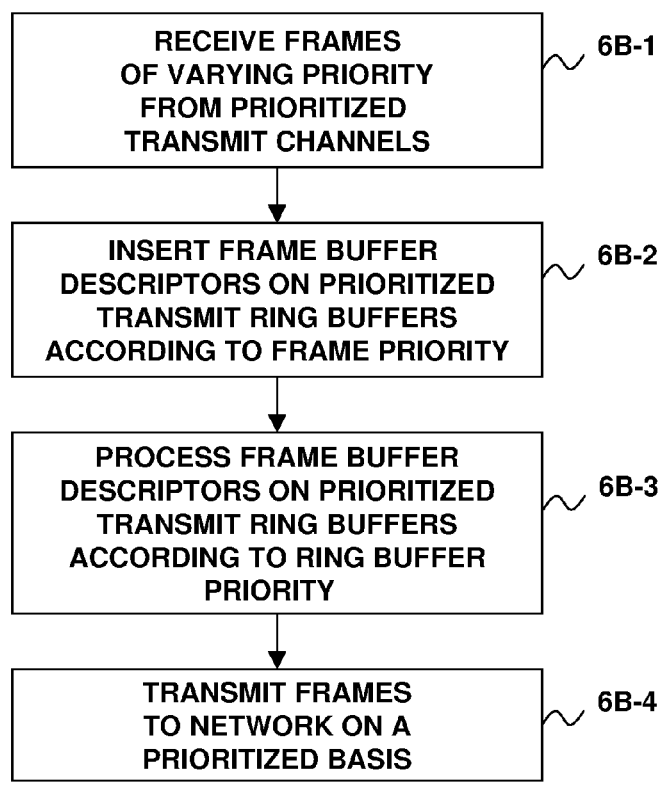
FIG. 6B is a flow diagram showing exemplary frame transmission processing performed by the IP network host of FIG. 6.

With additional reference now to the flow diagram of FIG. 6B, during frame transmission, buffer descriptors are received from the transmit channels $28B_4$, $28B_5$ and $28B_6$ (step 6B-1) and placed on the corresponding transmit ring buffers $32B_1$, $32B_2$ or $32B_3$ (step 6B-2) on a prioritized basis. In particular, the NIC device driver's ring buffer selection logic $26B_1$ and channel selection logic $26B_2$ identify and transfer buffer descriptors from the high priority transmit channel $28B_4$ to the high priority transmit ring buffer $32B_1$. Similarly, medium priority buffer descriptors are identified and transferred from the medium priority transmit channel $28B_5$ to the medium priority transmit ring buffer $32B_2$, and low priority buffer descriptors are identified and transferred from the low priority transmit channel $28B_6$ to the low priority transmit ring buffer $32B_3$. In step 6B-3, after the NIC 22B is notified that the new frames are ready for transmission, the NIC's priority mapping logic $22B_6$ processes the high priority transmit ring buffer $32B_1$ first so that high priority frames are transmitted ahead of medium priority and low priority frames. Similar processing is then performed on the medium priority transmit ring buffer $32B_2$, followed by the low priority transmit ring buffer $32B_3$. This removes the device bottleneck resulting from the interleaved processing of different priority frames and enables such frames to be transmitted onto the network link 24B according to their relative QoS priorities, thus resulting in QoS enhanced transmission (step 6B-4).

The kernel protocol channels $28B_1$, $28B_2$, $28B_3$, $28B_4$, $28B_5$ and $28B_6$ might themselves be given a weight that causes them to run with a preference. For example, the channel processing for the channels $28B_1$, $28B_2$, $28B_3$, $28B_4$, $28B_5$ and $28B_6$ could be implemented in separate execution threads, and channel weighting could be achieved using thread priority indicators that cause the threads to execute at different priority levels (e.g., as prioritized execution threads). Similarly, the priority might also inform data buffer allocation requests such that when the memory is low the requests associated with the lower priority task/packet are dropped. For example, the NIC device driver 22B may be responsible for allocating new buffer descriptors after it processes the receive ring buffers $34B_1$, $34B_2$ and $34B_3$. A buffer allocation mechanism 41 in the host operating system (e.g., as part of the kernel protocol stack 28B) could be implemented so that, when a low memory condition is present, only buffer allocation requests for the high priority receive ring buffer $34B_1$ will be granted while buffer allocation requests for the medium and low priority receive ring buffers $34B_2$ and $34B_3$ will be dropped until more memory becomes available. Similar buffer allocation processing may be performed on the transmit side. Thus, using the implementation of FIG. 6, high priority data will benefit from increased QoS due to a combination of the dedicated high priority ring buffers $32B_1$ and $34B_1$, high priority thread processing in the kernel protocol channels $28B_1$ and $28B_4$, and a memory allocation preference during low memory conditions. Exemplary implementations of kernel protocol channel processing are described in more detail below in connection with FIGS. 9 and 10.

Figure 7:
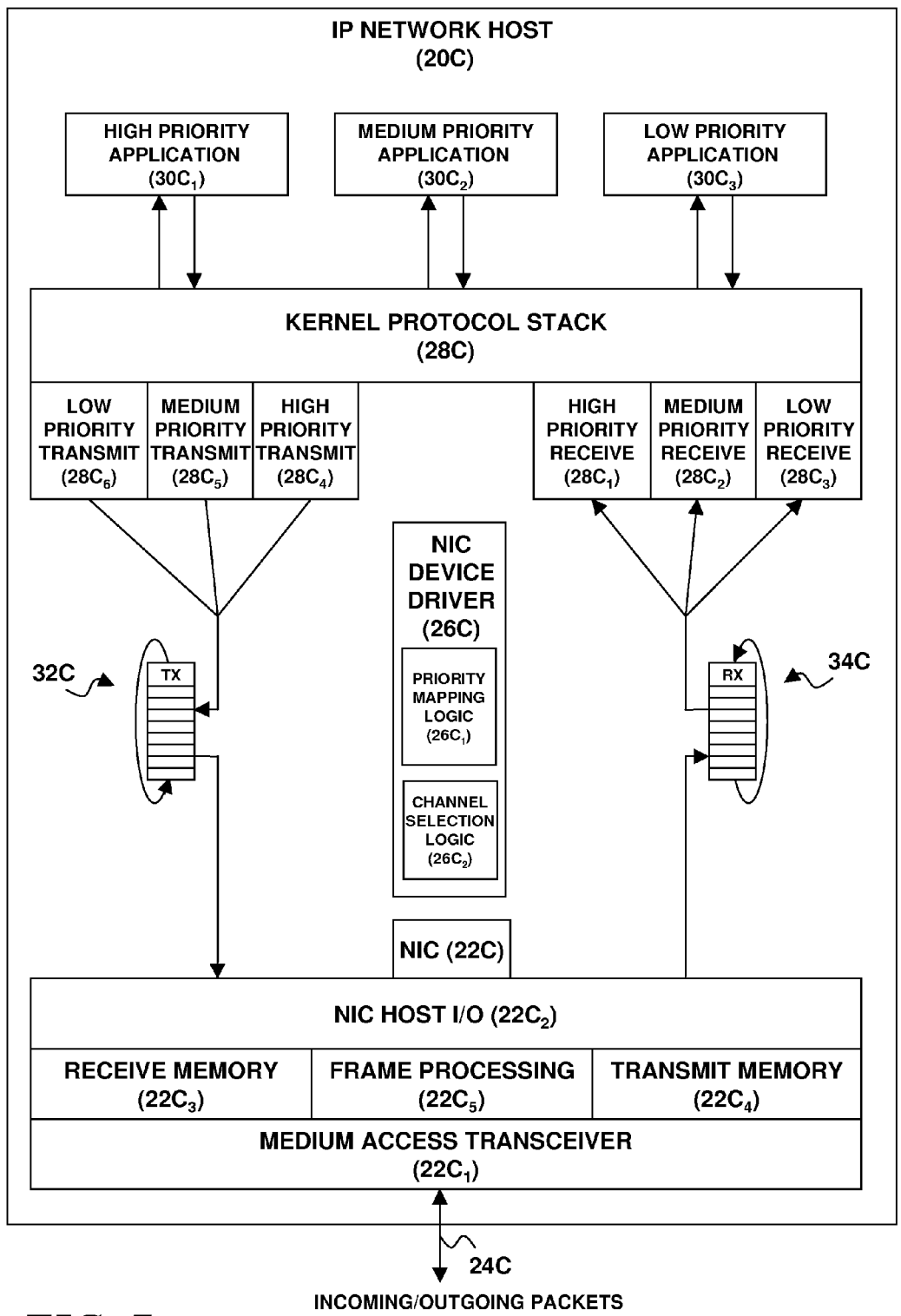
FIG. 7 is a functional block diagram showing exemplary network data processing performed by a third exemplary improved IP network host.

FIG. 7 illustrates an alternative implementation in which the network endpoint system 2 is embodied in an improved IP network host 20C that is identical in most respects to the network host 20B of FIG. 6 (as shown by the use of substantially corresponding reference numerals). However, in the FIG. 7 implementation a standard NIC 22C uses a single set of send/receive ring buffers 32C/34C (as described above per FIGS. 2-4). The NIC device driver 26C does not require ring buffer selection logic, but instead has priority mapping logic $26C_1$ for determining the QoS priority of buffer descriptors in the send/receive ring buffers 32C/34C. The NIC device driver 26 also includes channel selection logic $26C_2$ for associating the prioritized buffer descriptors with different kernel protocol channels, namely, kernel protocol receive channels $28C_1$, $28C_2$ and $28C_3$, and kernel protocol transmit channels $28C_4$, $28C_5$ and $28C_6$.

Figure 7A:
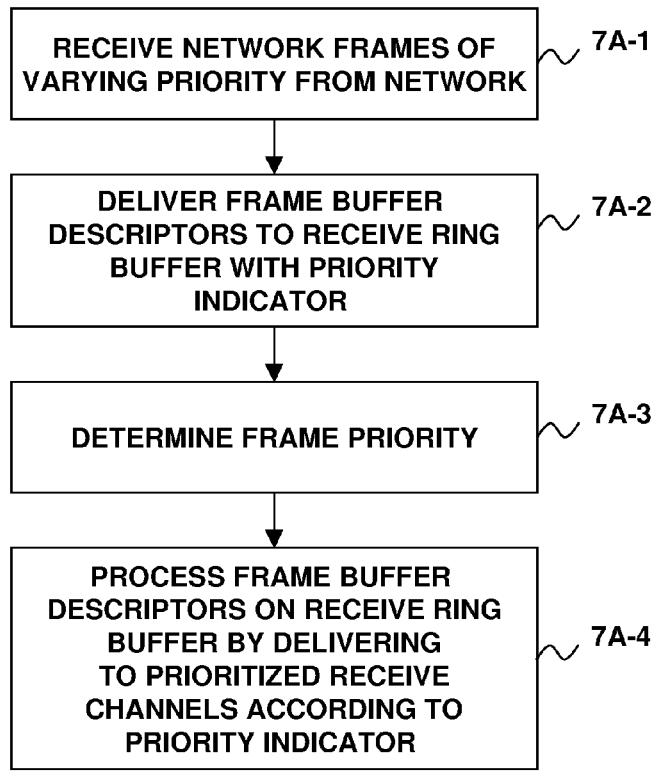
FIG. 7A is a flow diagram showing exemplary frame reception processing performed by the IP network host of FIG. 7.

With additional reference now to the flow diagram of FIG. 7A, during frame reception (step 7A-1), the NIC 22 places the frame (by reference) in the receive ring buffer 34C for processing (step 7A-2). Note that the frame referenced by the buffer descriptor will include a QoS indicator that indicates frame priority. Each time the NIC device driver 26C is invoked in response to a NIC hardware interrupt or a NIC polling operation, the buffer descriptors are processed on the receive ring buffer 34C to determine their respective priorities (step 7A-3) and are delivered to the prioritized receive channels $28C_1$, $28C_2$ and $28C_3$ based on the priorities (step 7A-4). In particular, the NIC device driver's priority mapping logic $26C_1$ and channel selection logic $26C_2$ respectively identify and transfer the buffer descriptors on the receive ring buffer 34C according to their priority. High priority buffer descriptors are identified and transferred to the high priority receive channel $28C_1$. Similarly, medium priority buffer descriptors are identified and transferred from the receive ring buffer 34C to the medium priority receive channel $28C_3$, and low priority buffer descriptors are identified and transferred from the receive ring buffer 34C to the low priority receive channel $28C_3$. The NIC device driver 26 will thus associate incoming frames with kernel protocol channels of the correct priority. As described above in connection with FIG. 6, these kernel protocol channels can run in different execution threads having differing priorities.

Figure 7B:
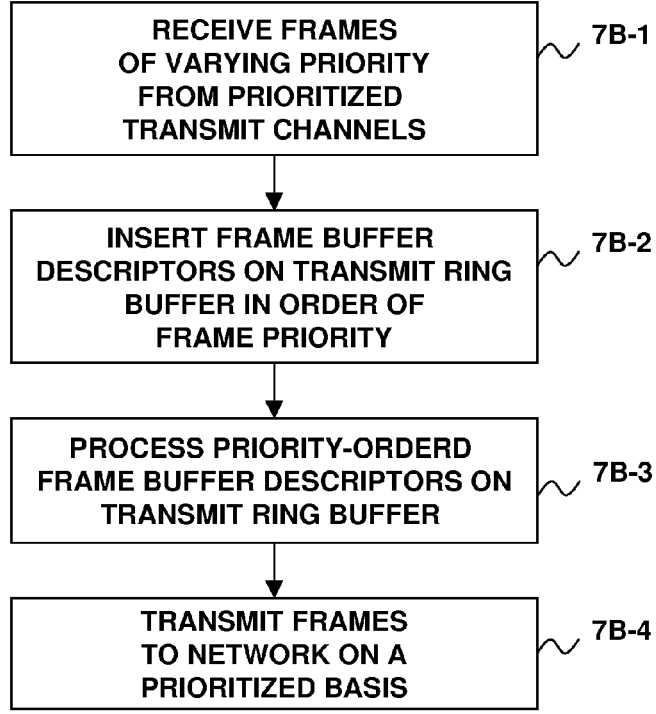
FIG. 7B is a flow diagram showing exemplary frame transmission processing performed by the IP network host of FIG. 7.

With additional reference now to the flow diagram of FIG. 7B, during frame transmission, buffer descriptors are received from the transmit channels $28C_4$, $2C_5$ and $28C_6$ (step 7B-1) and placed on the transmit ring buffer 32C (step 7B-2) in order of frame priority. In particular, the NIC device driver's priority mapping logic $26C_1$ and channel selection logic $26C_2$ first identify and transfer buffer descriptors from the high priority transmit channel $28C_4$ to the transmit ring buffer 32C. Similarly, medium priority buffer descriptors are then identified and transferred from the medium priority transmit channel $28C_5$ to the transmit ring buffer 32C, and low priority buffer descriptors are identified and transferred from the low priority transmit channel $28C_6$ to the transmit ring buffer 32C. Outbound frames will thus be provided to the NIC 22C for transmission by kernel protocol channels having varying priority. In particular, in step 7B-3, after the NIC 22C is notified that the new frames are ready for transmission, the NIC processes the priority-ordered buffer descriptors on the transmit ring buffer 32C. Due to the priority ordering, high priority frames are transmitted ahead of medium priority and low priority frames. This removes the device bottleneck resulting from the interleaved processing of different priority frames and enables such frames to be transmitted onto the network link 24C according to their relative QoS priorities, thus resulting in QoS enhanced transmission (step 7B-4).

Figure 8:
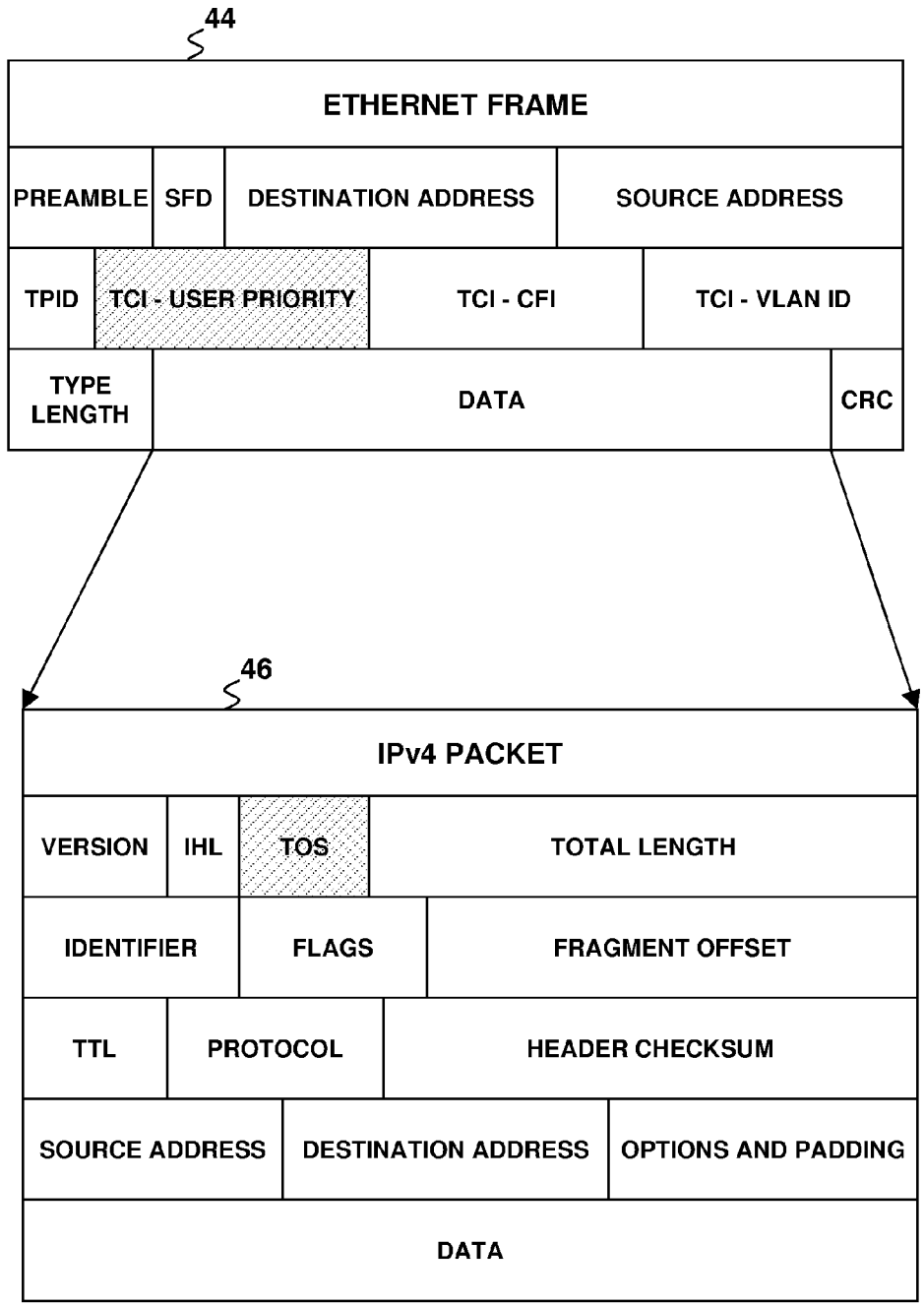
FIG. 8 is a diagrammatic illustration of a link layer Ethernet frame encapsulating an IPv4 network layer packet.

In any of the implementations shown in FIGS. 5, 6 and 7, the edge router 8 shown in FIG. 1 that is situated at the ingress of the network 4 can be implemented with priority insertion logic 42 that inserts a priority indicator in link layer frames if this information is not already present. This would be the case where a network level QoS mechanism such as DiffServ is used in the network 4. The link layer priority indicator is needed because NICs conventionally inspect link layer frame information but only the IP address portion of the frame-encapsulated IP network layer packet. As shown in the exemplary Ethernet frame 44 of FIG. 8, the link layer priority indicator may be inserted in accordance with the IEEE 802.1Q/802.1P standards. In particular, IEEE 802.1P user priority bits may be inserted in an IEEE 802.1Q TCI (Tag Control Information) field of the Ethernet frame 44 (labeled "TCI-USER PRIORITY"). Other link layer priority indicators may also be used. The priority insertion logic 42 inspects the IP packet portion of the frame 44 to determine the value of the network level QoS priority indicator therein. In FIG. 8, the frame 44 is shown to encapsulate an IPv4 (Internet Protocol version 4) network layer packet 46. The TOS (Type of Service) field of the packet 46 is used for DiffServ-style QoS management. After determining the value of the QoS information in the TOS field of the packet 46, the priority insertion logic 42 maps it to a corresponding link layer QoS value and inserts this value in the TCI-USER PRIORITY field of the frame 44.

Alternatively, in lieu of having the edge router insert link layer priority indicators, any of the NICs 22A, 22B and 22C could be adapted to inspect the encapsulated IP packet 46 for its network level priority indicator. If the NICs 22A, 22B and 22C are not adapted to support this inspection, the priority classification could be performed by the respective NIC device drivers 26A, 26B and 26C.

Figure 9:
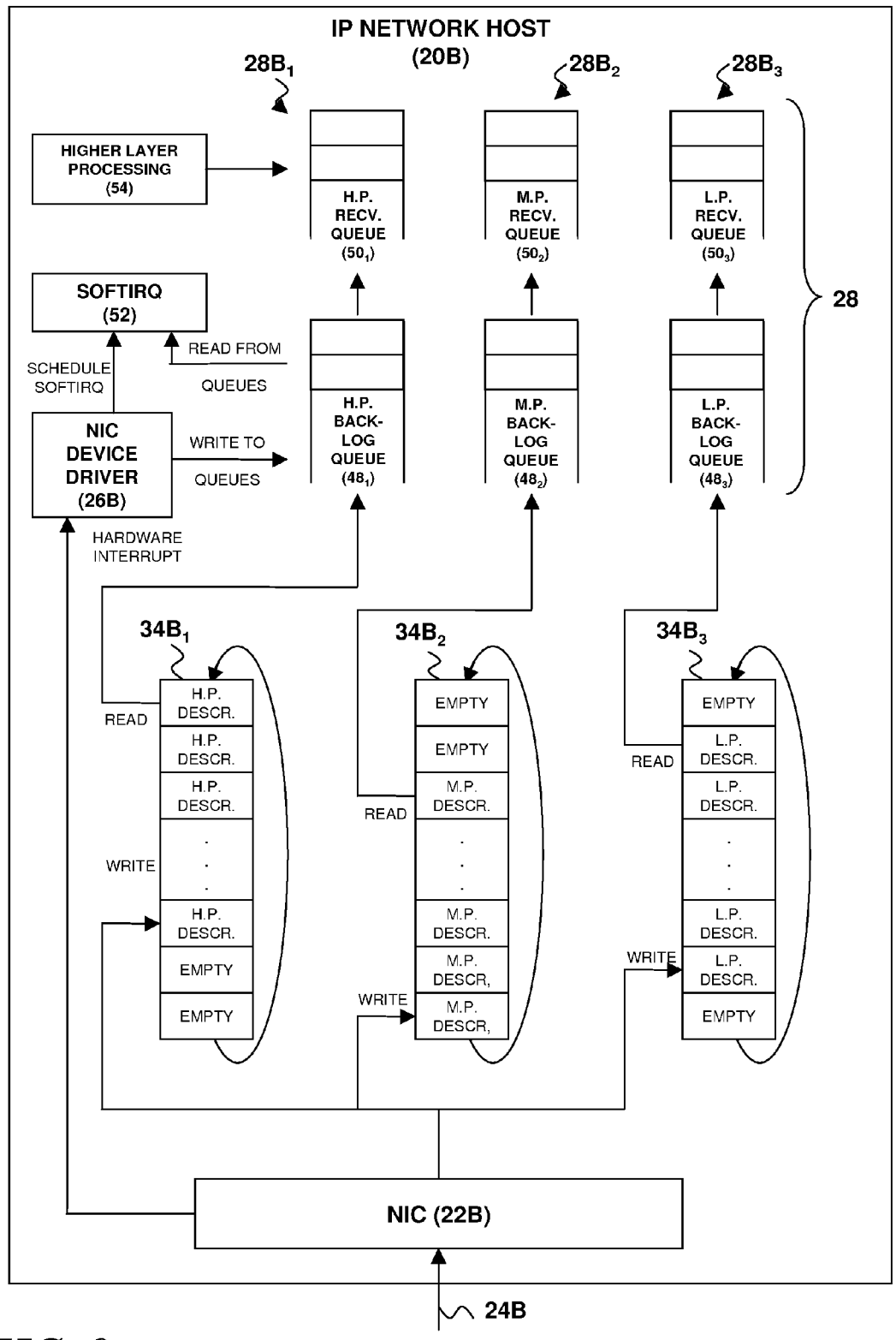
FIG. 9 is a functional block diagram showing a first alternative implementation of the second exemplary improved IP network host of FIG. 6.
Figure 10:
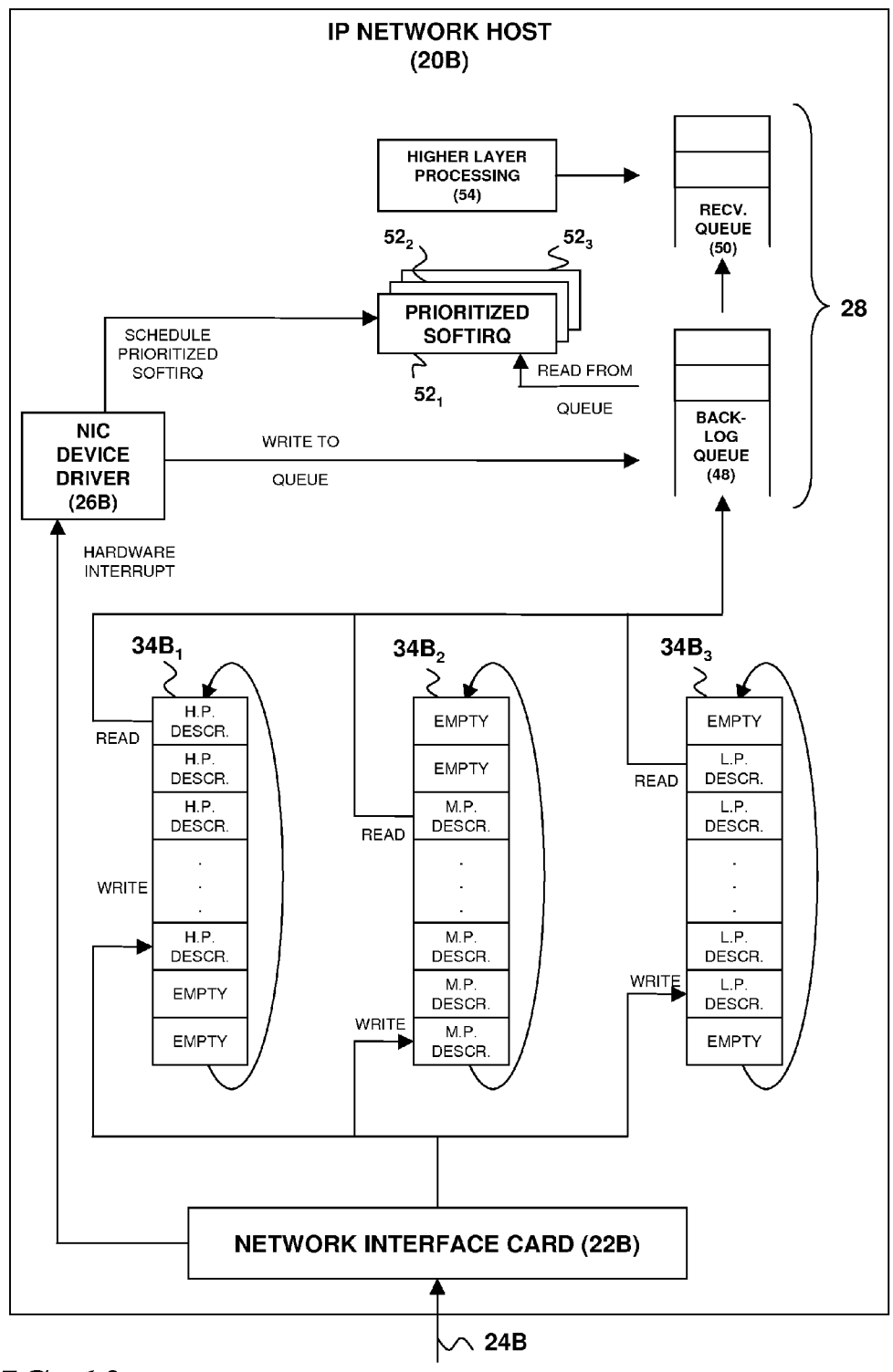
FIG. 10 is a functional block diagram showing a second alternative implementation of the second exemplary improved IP network host of FIG. 6.

Turning now to FIGS. 9 and 10, two alternative techniques for implementing the kernel protocol channels used by the IP network host 20B of FIG. 6 are shown. By way of example only, FIGS. 9 and 10 illustrate how multi-channel frame processing may be performed in the IP network host 20B, which uses plural ring buffers and plural kernel protocol channels. Note that the same kernel protocol processing techniques could be used in the IP network host 20C of FIG. 7, except that only a single ring buffer pair would be present.

In FIG. 9, the three receive ring buffers $34B_1$, $34B_2$ and $34B_3$ are shown receiving buffer descriptors from the NIC 22B following frame reception on the network link 24B. As described above, after NIC 22B writes buffer descriptors of varying priority to the ring buffers $34B_1$, $34B_2$ and $34B_3$, the NIC device driver 26B is invoked (typically via a hardware interrupt) to retrieve the buffer descriptors and forward them to the kernel protocol stack 28B. In some operating systems, such as Linux® kernel version 2.6, a NIC device driver running in hardware interrupt context transfers buffer descriptors on the receive ring buffer to a per-cpu backlog queue. Following the enqueue operation, the device driver schedules a software interrupt (softirq) to process the backlog queue, then exits the hardware interrupt. When the software interrupt is invoked, it processes the buffer descriptors on the backlog queue, causing them to be passed up the kernel protocol stack to a receive queue.

In the implementation of FIG. 9, the kernel protocol channels $28B_1$, $28B_2$ and $28B_3$ are implemented as a set of prioritized backlog queues 48 and a corresponding set of receive queues 50. In particular, for the high priority kernel protocol channel $28B_1$, there is a high priority backlog queue $48_1$ and a high priority receive queue $50_1$. Similarly, for the high medium priority kernel protocol channel $28B_2$ there is a medium priority backlog queue $48_2$ and a medium priority receive queue $50_2$, and for the low priority protocol channel $28B_3$ there is a low priority backlog queue $48_3$ and a low priority receive queue $50_3$. Software interrupt logic 52 is used to process the backlog queues $48_1$, $48_2$ and $48_3$. Instead of performing conventional buffer descriptor processing on a single backlog queue, the software interrupt logic 52 in FIG. 9 may be adapted to process the backlog queues 48$_1$, 48$_2$ and 48$_3$ in sequential fashion, beginning with the high priority backlog queue 48$_1$, followed by the medium priority backlog queue 48$_2$, and ending with the low priority backlog queue 48$_3$. In this way, the buffer descriptors in the respective queues will be processed by the software interrupt 52 in prioritized fashion. Other queue processing algorithms could also be used, such as a weighted round robin algorithm that causes the software interrupt 52 to favor processing of the high priority backlog queue 48$_1$ over the other queues. Time limits could be placed on the processing of each backlog queue 48$_1$, 48$_2$ and 48$_3$ to ensure that each queue receives attention before the software interrupt 52 relinquishes the host processor. Higher layer processing logic 54 may be used to process the varying priority buffer descriptors on the receive queues 50$_1$, 50$_2$ and 50$_3$ in analogous fashion. If desired, the higher layer processing logic 54 could be multi-threaded so that each receive queue 50$_1$, 50$_2$ and 50$_3$ is processed by an execution thread of corresponding priority.

In FIG. 10, the kernel protocol channels 28$_1$, 28$_2$ and 28$_3$ are handled somewhat differently. Only a single backlog queue 48 and receive queue 50 are used. Prioritized buffer descriptor handling during packet reception may then be provided by multiple levels of software interrupt logic 52 so as to provide multi-threaded buffer descriptor processing. In particular, the IP network host 20B of FIG. 10 may implement a high priority software interrupt 52$_1$, a medium priority software interrupt 52$_2$ and, if necessary, a low priority software interrupt 52$_3$. These interrupts may run at corresponding high, medium and low thread priority levels. After the NIC device driver 26B sequentially places high priority, medium priority and low priority buffer descriptors on the backlog queue 48, it can separately schedule the software interrupts 52$_1$, 52$_2$, and 52$_3$ for execution. The high priority software interrupt 52$_1$ will execute first due to its high priority and process high priority buffer descriptors. The high priority software interrupt 52$_2$ may also continue to process medium and low priority buffer descriptors, if it has time. Otherwise, these buffer descriptors may be handled by the medium priority software interrupt 52$_2$, followed by the low priority software interrupt 52$_3$, if necessary. The higher layer processing 54 of FIG. 10 is the same as in FIG. 9.

Figure 11:
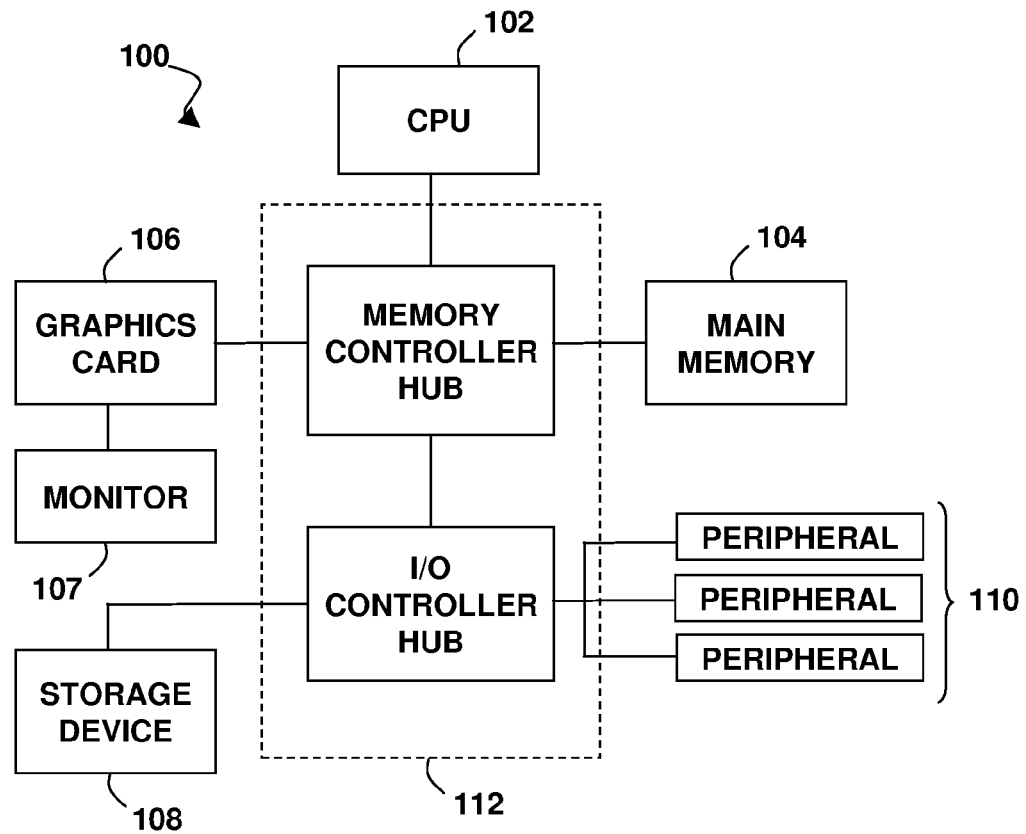
FIG. 11 is a functional block diagram showing exemplary data processing hardware that may be used to provide a system for implementing the improved IP network hosts of FIGS. 5-7.

Accordingly, a technique for enhancing end-to-end network QoS has been disclosed. It will be appreciated that the foregoing concepts may be variously embodied in any of a data processing system, a machine implemented method, and a computer program product in which programming logic is provided by one or more machine-useable media for use in controlling a data processing system to perform the required functions. Relative to a data processing system and machine implemented method, FIG. 11 illustrates an exemplary hardware environment 100 that may be used to implement the network endpoint system 2. The hardware environment 100 includes a CPU or other data processing resource 102 and a main memory 104 that provide a data processing core, a graphics card 106 for generating visual output information to a display monitor 107, a peripheral storage device 108, other peripheral devices 110, and a bus infrastructure 112 interconnecting the foregoing elements. The software components of the network endpoint system 2 may be loaded in the main memory 104. Various I/O (Input/Output) resources may be provided by the peripheral devices 110, which may include a USB bus controller, a SCSI disk controller, and a NIC. The monitor 107 may be implemented as part of a user interface.

Figure 12:
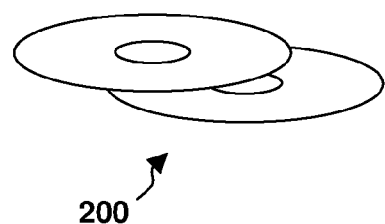
FIG. 12 is a diagrammatic representation of exemplary storage media that may be used in a computer program product implementation of software and/or firmware logic of the network hosts of FIGS. 5-7.

Relative to a computer program product having a machine-readable media and programming logic, exemplary data storage media for storing the programming logic are shown by reference numeral 200 in FIG. 12. The media 200 are shown as being portable optical storage disks of the type that are conventionally used for commercial software sales, such as compact disk-read only memory (CD-ROM) disks, compact disk-read/write (CD-R/W) disks, and digital versatile disks (DVDs). Such media can store the programming logic of the network endpoint system 2, either alone or in conjunction with another software product that incorporates the required functionality. The programming logic could also be provided by portable magnetic media (such as floppy disks, flash memory sticks, etc.), or magnetic media combined with drive systems (e.g. disk drives), or media incorporated in data processing platforms, such as random access memory (RAM), read-only memory (ROM) or other semiconductor or solid state memory. More broadly, the media could comprise any electronic, magnetic, optical, electromagnetic, infrared, semiconductor system or apparatus or device, transmission or propagation medium (such as a network), or other entity (including a signal) that can contain, store, communicate, propagate or transport the programming logic for use by or in connection with a data processing system, computer or other instruction execution system, apparatus or device. It will also be appreciated that the invention may be embodied in a combination of hardware logic and software elements, and that the software elements may include but are not limited to firmware, resident software, microcode, etc.

While various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A network endpoint system for receiving network data of varying priority on behalf of a data consumer operating at the application layer of a network protocol stack implemented by said network endpoint system, comprising:

a network interface controller operable to receive network frames containing inbound network data of differing QoS (Quality of Service) network data priority, wherein said network data priority of each said network frame relates to QoS characteristics comprising at least one of dropped packets, latency and jitter;

plural network data handling channels each having a different associated QoS network data priority and representing a pathway for kernel protocol stack processing of said inbound network data, each of said data handling channels being accessible by said network interface controller at substantially the same time; and priority processing logic configured to evaluate said network data priority of said network frames and selectively transfer said inbound network data from said network interface controller to different ones of said plural data handling channels by matching said network data priority of said network data frames to said associated QoS network data priority of said data handling channels and present said inbound network data for kernel protocol stack processing on a prioritized basis according to said network data priority of said network frames such that higher priority inbound network data is presented through higher priority data handling channels for kernel protocol stack processing more quickly than lower priority inbound network data that is presented through lower priority data handling channels, wherein said network data priority of each said network frame is indicated by a priority indicator field in said network frame, and wherein said network interface controller or a network interface controller device driver in said system implements a portion of said priority processing logic that inspects said priority indicator field as one of a link layer priority indicator in a link layer portion of said frame or a network layer priority indicator in a network packet portion of said frame.

2. A system in accordance with claim 1, wherein:

said plural network data handling channels comprise plural ring buffers containing buffer descriptors corresponding to said inbound network data, each of said ring buffers having an associated ring buffer priority;

a first portion of said priority processing logic is implemented by priority mapping logic in said network interface controller adapted to inspect said network frames and deliver said buffer descriptors to said plural ring buffers according to said network data priorities of said network frames and said ring buffer priorities; and a second portion of said priority processing logic is implemented by ring buffer selection logic in a network interface controller device driver in said system adapted to process said buffer descriptors in said plural ring buffers and deliver said buffer descriptors for kernel protocol stack processing according to said ring buffer priority.

3. A system in accordance with claim 2, further including buffer allocation logic adapted to allocate said buffer descriptors on a prioritized basis according to said network data priorities of said network frames and in accordance with memory availability.

4. A system in accordance with claim 1, wherein:

said plural network data handling channels comprise plural kernel protocol stack channels configured to process buffer descriptors corresponding to said inbound network data, each of said kernel protocol stack channels having an associated kernel protocol stack channel priority; and said priority processing logic is implemented by channel selection logic in a network interface controller device driver in said system configured to deliver said buffer descriptors to said kernel protocol stack channels according to said kernel protocol stack channel priority.

5. A system in accordance with claim 4, wherein said plural network data handling channels comprise plural buffer descriptor queues, each having an associated buffer descriptor queue priority and being configured to enqueue said buffer descriptors according to said network data priorities of said network frames.

6. A system in accordance with claim 4, wherein said plural kernel protocol stack channels comprise prioritized buffer descriptor processing threads providing a prioritized allocation of processing resources for handling said inbound network data according to said kernel protocol stack channel priorities.

7. A system in accordance with claim 1, wherein:

said plural network data handling channels comprise plural comprise plural ring buffers containing buffer descriptors corresponding to said inbound network data, each of said ring buffers having an associated ring buffer priority;

said plural network data handling channels further comprise plural kernel protocol stack channels adapted to process buffer descriptors corresponding to said inbound network data, each of said kernel protocol stack channels having an associated kernel protocol stack channel priority;

said priority processing logic is implemented by priority mapping logic in said network interface controller adapted to inspect said network frames and deliver said buffer descriptors to said plural ring buffers according to said network data priorities of said network frames and said ring buffer priorities;

said priority processing logic is further implemented by ring buffer selection logic in a network interface controller device driver in said system adapted to process said buffer descriptors in said plural ring buffers according to said ring buffer priority; and said priority processing logic is further implemented by channel selection logic in said network interface controller device driver adapted to deliver said buffer descriptors on said plural ring buffers to said kernel protocol stack channels according to said kernel protocol stack channel priority.

8. A system in accordance with claim 1, wherein said plural network data handling channels receive a prioritized allocation of processing resources and memory resources for handling QoS network data priorities of said data handling channels based on said associated priority.

9. A method for receiving network data of varying priority on behalf of a data consumer operating at the application layer of a network protocol stack, comprising:

receiving network frames containing inbound network data of differing QoS (Quality of Service) network data priority at a network interface controller, wherein said network data priority of each said network frame relates to QoS characteristics comprising at least one of dropped packets, latency and jitter;

providing plural network data handling channels each having a different associated QoS network data priority and representing a pathway for kernel protocol stack processing of said inbound network data, each of said data handling channels being accessible by said network interface controller at substantially the same time; and performing priority processing to evaluate said network data priority of said network frames and selectively transfer said inbound network data from said network interface controller to different ones of said plural network data handling channels by matching said network data priority of said network data frames to said associated QoS network data priorities of said data handling channels and to present said inbound network data for kernel protocol stack processing on a prioritized basis according to said network data priority of said network frames such that higher priority inbound network data is presented through higher priority data handling channels for kernel protocol stack processing more quickly than lower priority inbound network data that is presented through lower priority data handling channels, wherein said network data priority of each said network frame is indicated by a priority indicator field in said network frame, and wherein said priority processing further includes inspecting said priority indicator field as one of a link layer priority indicator in a link layer portion of said frame or a network layer priority indicator in a network packet portion of said frame.

10. A method in accordance with claim 9, wherein:

said plural network data handling channels comprise plural ring buffers containing buffer descriptors corresponding to said inbound network data, each of said ring buffers having an associated ring buffer priority;
a first portion of said priority processing is implemented by priority mapping logic in said network interface controller adapted to inspect said network frames and deliver said buffer descriptors to said plural ring buffers according to said network data priorities of said network frames and said ring buffer priorities; and
a second portion of said priority processing is implemented by ring buffer selection logic in a network interface controller device driver in said system adapted to process said buffer descriptors in said plural ring buffers and deliver said buffer descriptors for kernel protocol stack processing.

11. A method in accordance with claim 10, further including allocating said buffer descriptors on a prioritized basis according to said network data priorities of said network frames and in accordance with memory availability.

12. A method in accordance with claim 9, wherein:
said plural network data handling channels comprise plural kernel protocol stack channels configured to process buffer descriptors corresponding to said inbound network data, each of said kernel protocol stack channels having an associated kernel protocol stack priority; and
said priority processing is implemented by channel selection logic in a network interface controller device driver in said system configured to deliver said buffer descriptors to said kernel protocol stack channels according to said kernel protocol stack channel priorities of said network frames.

13. A method in accordance with claim 12, wherein said plural network data handling channels comprise plural buffer descriptor queues, each having an associated buffer descriptor queue priority and being configured to enqueue said buffer descriptors according to said network data priorities of said network frames.

14. A method in accordance with claim 12, wherein said plural kernel protocol stack channels comprise prioritized buffer descriptor processing threads providing a prioritized allocation of processing resources for handling said inbound network data according to said kernel protocol stack channel priorities.

15. A method in accordance with claim 9, wherein:
said plural network data handling channels comprise plural ring buffers containing buffer descriptors corresponding to said inbound network data, each of said ring buffers having an associated ring buffer priority;
said plural network data handling channels further comprise plural kernel protocol stack channels adapted to process buffer descriptors corresponding to said inbound network data, each of said kernel protocol stack channels having an associated kernel protocol stack channel priority;
said priority processing is implemented by priority mapping logic in said network interface controller adapted to inspect said network frames and deliver said buffer descriptors to said plural ring buffers according to said network data priorities of said network frames and said ring buffer priorities;
said priority processing is further implemented by ring buffer selection logic in a network interface controller device driver in said system adapted to process said buffer descriptors in said plural ring buffers according to said ring buffer priority; and
said priority processing logic is further implemented by channel selection logic in said network interface controller device driver adapted to deliver said buffer descriptors on said plural ring buffers to said kernel protocol stack channels according to said kernel protocol stack channel priority.

16. A method in accordance with claim 9, wherein said plural network data handling channels receive a prioritized allocation of processing resources and memory resources for handling said inbound network data based on said associated QoS network data priorities of said data handling channels.

17. A computer program product, comprising:
one or more non-transitory computer useable storage media;
programming logic stored on said computer useable storage media, such programming logic when executed by a computer causing a data processing platform to receive network data of varying priority on behalf of a data consumer operating at the application layer of a network protocol stack, by:
receiving network frames containing inbound network data of differing QoS (Quality of Service) network data priority at a network interface controller, wherein said network data priority of each said network frame relates to QoS characteristics comprising at least one of dropped packets, latency and jitter;
providing plural network data handling channels each having a different associated QoS network data priority and representing a pathway for kernel protocol stack processing of said inbound network data, each of said data handling channels being accessible by said network interface controller at substantially the same time; and
performing priority processing to evaluate said network data priority of said network frames and selectively transfer said inbound network data from said network interface controller to different ones of said plural network data handling channels by matching said network data priority of said network data frames to said associated QoS network data priorities of said data handling channels and present said inbound network data for kernel protocol stack processing on a prioritized basis according to said network data priority of said network frames such that higher priority inbound network data is presented through higher priority data handling channels for kernel protocol stack processing more quickly than lower priority inbound network data that is presented through lower priority data handling channels,
wherein said network data priority of each said network frame is indicated by a priority indicator field in said network frame, and
wherein said priority processing further includes inspecting said priority indicator field as one of a link layer priority indicator in a link layer portion of said frame or a network layer priority indicator in a network packet portion of said frame.

18. A computer program product in accordance with claim 17, wherein:
said plural network data handling channels comprise plural ring buffers containing buffer descriptors corresponding to said inbound network data, each of said ring buffers having an associated ring buffer priority;
a first portion of said priority processing is implemented by priority mapping logic in said network interface controller adapted to inspect said network frames and deliver said buffer descriptors to said plural ring buffers according to said network data priorities of said network frames and said ring buffer priorities; and
a second portion of said priority processing is implemented by ring buffer selection logic in a network interface controller device driver in said system adapted to process said buffer descriptors in said plural ring buffers and deliver said buffer descriptors for kernel protocol stack processing according to said ring buffer priority.

19. A computer program product in accordance with claim 18, further including allocating said buffer descriptors on a prioritized basis according to said network data priorities of said network frames and in accordance with memory availability.

20. A computer program product in accordance with claim 17, wherein:
   said plural network data handling channels comprise plural kernel protocol stack channels configured to process buffer descriptors corresponding to said inbound network data, each of said kernel protocol stack channels having an associated kernel protocol stack channel priority; and
   said priority processing is implemented by channel selection logic in a network interface controller device driver in said system configured to deliver said buffer descriptors to said kernel protocol stack channels according to said kernel protocol stack channel priority.

21. A computer program product in accordance with claim 20, wherein said plural network data handling channels comprise plural buffer descriptor queues, each having an associated buffer descriptor queue priority and being configured to enqueue said buffer descriptors according to said network data priorities of said network frames.

22. A computer program product in accordance with claim 20, wherein said plural kernel protocol stack channels comprise prioritized buffer descriptor processing threads providing a prioritized allocation of processing resources for handling said inbound network data according to said kernel protocol stack channel priorities.

23. A computer program product in accordance with claim 17, wherein:
   said plural network data handling channels comprise plural comprise plural ring buffers containing buffer descriptors corresponding to said inbound network data, each of said ring buffers having an associated ring buffer priority;
   said plural network data handling channels further comprise plural kernel protocol stack channels adapted to process buffer descriptors corresponding to said network data, each of said kernel protocol stack channels having an associated kernel protocol stack channel priority;
   said priority processing is implemented by priority mapping logic in said network interface controller adapted to inspect said network frames and deliver said buffer descriptors to said plural ring buffers according to said network data priorities of said network frames and said ring buffer priorities;
   said priority processing is further implemented by ring buffer selection logic in a network interface controller device driver in said system adapted to process said buffer descriptors in said plural ring buffers according to said ring buffer priority; and
   said priority processing is further implemented by channel selection logic in said network interface controller device driver adapted to deliver said buffer descriptors on said plural ring buffers to said kernel protocol stack channels according to said kernel protocol stack channel priority.

24. A computer program product in accordance with claim 17, wherein said plural network data handling channels receive a prioritized allocation of processing resources and memory resources for handling said inbound network data based on said associated QoS network data priorities of said data handling channels.

\* \* \* \* \*